(12) United States Patent
Shapiro

(10) Patent No.: US 11,459,117 B1
(45) Date of Patent: Oct. 4, 2022

(54) DRONE-BASED CAMERAS TO DETECT WIND DIRECTION FOR LANDING

(71) Applicant: Amazon Technologies, Inc., Settle, WA (US)

(72) Inventor: Ben Lloyd Shapiro, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 568 days.

(21) Appl. No.: 16/578,831

(22) Filed: Sep. 23, 2019

(51) Int. Cl.
*B64D 45/08* (2006.01)
*B64C 39/02* (2006.01)
*B64F 1/20* (2006.01)
*G08G 5/00* (2006.01)

(52) U.S. Cl.
CPC ............ *B64D 45/08* (2013.01); *B64C 39/024* (2013.01); *B64F 1/20* (2013.01); *G08G 5/0069* (2013.01); *B64C 2201/128* (2013.01); *B64D 2203/00* (2013.01)

(58) Field of Classification Search
CPC .. B64D 45/08; B64D 2203/00; B64C 39/024; B64C 2201/128; B64F 1/20; G08G 5/0069
USPC .......................................................... 244/48
See application file for complete search history.

(56) References Cited

U.S. PATENT DOCUMENTS

2018/0327091 A1* 11/2018 Burks ..................... B64F 1/007
2020/0005651 A1* 1/2020 Priest ................... G08G 5/0026

* cited by examiner

*Primary Examiner* — Gertrude Arthur Jeanglaude
(74) *Attorney, Agent, or Firm* — Lowenstein Sandler LLP

(57) ABSTRACT

Technologies for drone-based cameras to detect proper wind direction for landing are described. One aerial vehicle can determine that it is in a vertical take-off and landing (VTOL) orientation and capture an image of a landing-pad device using the camera. The aerial vehicle can detect a visual marker in the image and can determine a wind direction, at a location of the landing page, from the visual marker. The wind direction is used by a propulsion subsystem to align the aerial vehicle into the wind direction for landing.

20 Claims, 11 Drawing Sheets

DRONE-BASED CAMERAS TO DETECT WIND DIRECTION FOR LANDING

BACKGROUND

Unmanned Aerial Vehicles (UAVs), such as a drone in Vertical Take-Off and Landing (VTOL) orientation, should point into the wind for landing. That is, a drone in a VTOL orientation can use the wind direction to ease landing. Similarly, wind information can help other types of vehicles when landing. Some UAVs use on-board sensors or systems to measure wind speed and wind direction in order to point into the wind for landing. The sensors or systems contribute to the complexity of the UAV, the number of components of the UAV, the form factor of the UAV, and the like.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
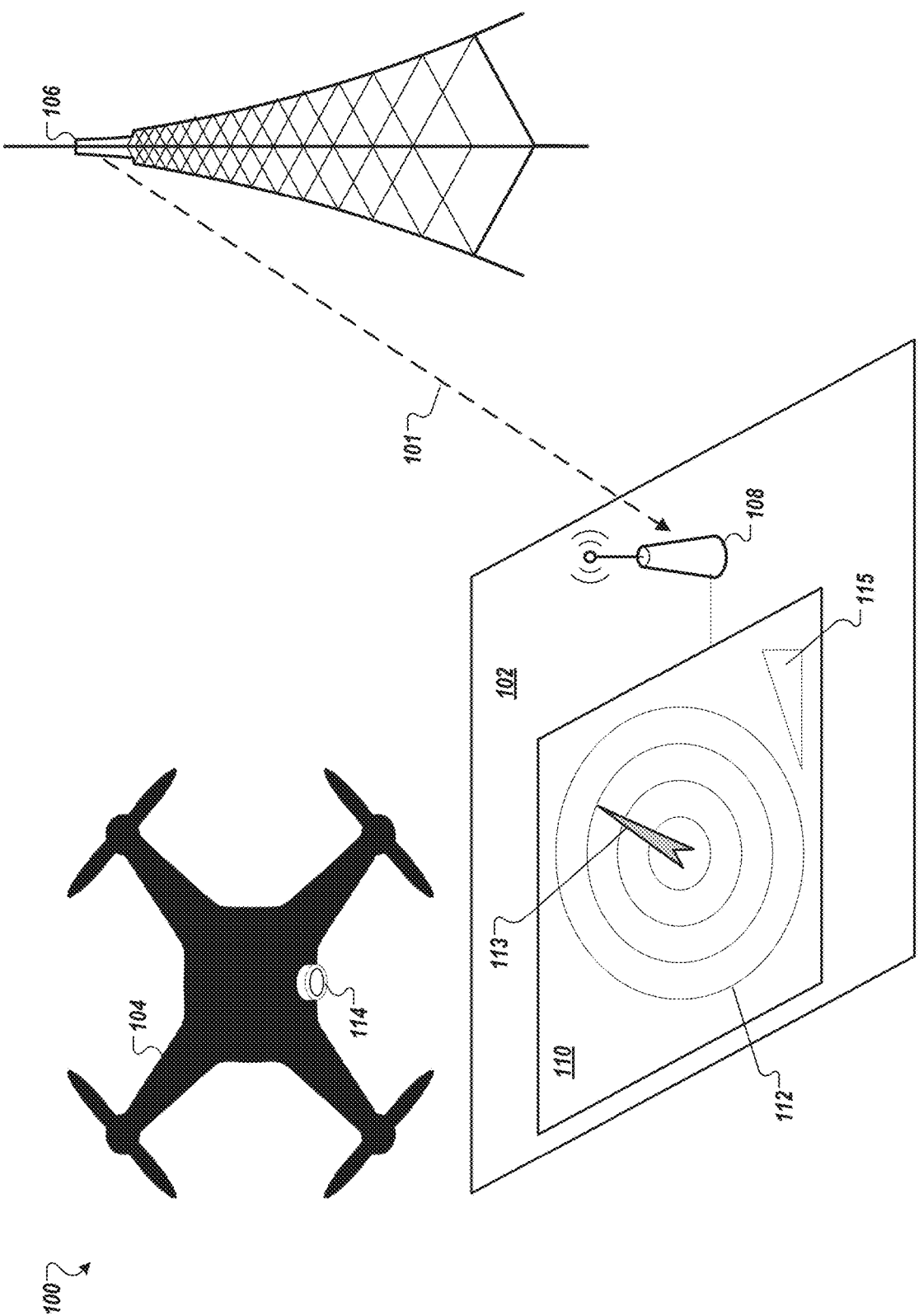
FIG. 1 is a system diagram of a landing system with a landing-pad device, a VTOL drone with a camera to detect wind direction for landing, and a weather station according to one embodiment.

Technologies for drone-based cameras to detect proper wind direction for landing are described. As described above, wind information can be useful for aerial vehicles when landing. Conventionally, a drone can establish a wireless communication with an external weather station system and receive the wind information over a wireless connection. For example, the drone receives wind direction data from the external weather station system and the drone points into the wind based on the wind direction data received over the wireless connection. As described above, the sensors or systems used to receive wind direction data from the weather station or to determine win direction itself can contribute to the complexity of the drone, the number of components of the drone, the form factor of the drone, and the like.

Aspects of the present disclosure address the above and other deficiencies by detecting proper wind direction for landing using drone-based cameras as described herein. One aerial vehicle can determine that it is in a VTOL orientation (or simply a vertical landing orientation) and captures an image of a landing-pad device using the camera. The aerial vehicle can detect a visual marker in the image and can determine a wind direction, at a location of the landing page, from the visual marker. The wind direction is used by a propulsion subsystem to align the aerial vehicle into the wind direction for landing. In some cases, the present embodiments use computer vision to detect the wind direction, as well as a magnitude of the wind in other cases. In one computer vision approach, a landing-pad device can have a ring of Light Emitting Diodes (LEDs), such as ultra-bright LEDs embedded in the landing-pad device. A weather station or weather service can feed data to the landing-pad device. The landing-pad device, based on the data, lights up a set of LEDs to indicate a wind direction. For example, the LEDs can draw a triangle on the landing-pad device, where one of the vertices of the triangle is designated as a marked of wind direction. In some embodiments, the color or intensity of the set of LEDs could represent the wind intensity or speed. In other computer vision approaches, the landing-pad device can have a display, such as a Liquid Crystal Display (LCD) or other display technologies to display the triangle, or other visual markers, indicating the wind direction, as well as the wind speed, as described herein. As the drone is approaching the landing-pad device in a VTOL orientation, the drone can use a downward camera to inspect the triangle on the drone landing-pad device and use that information to orient itself into the wind.

Various embodiments described herein are described with respect to a VTOL drone. In other embodiments, the unmanned aircraft (e.g., UAV, drones, or the like) can be used. The VTOL unmanned aircraft categories include Multicopters/Multirotors, Quadcopters, Hexacopters, Octocopters, Aerial Robots, as well as larger unmanned helicopters and cargo aircraft. In other embodiments, the aerial vehicle can be a transitioning drone that transitions between a VTOL orientation for take-off and landing and a fixed-wing orientation for forward flight. Alternatively, the aerial vehicle can be any type of aerial vehicle that is configured to be in a vertical landing orientation for landing.

FIG. 1 is a system diagram of a landing system 100 with a landing-pad device 102, a VTOL drone 104 with a camera to detect wind direction for landing, and a weather station system 106 according to one embodiment. As described herein, for the best chance of a smooth landing, drones in VTOL orientation should point into the wind for landing. This can be done by having a weather station system 106 send wind data 101 over a wired or wireless connection between the weather station system 106 and a radio 108 of the landing-pad device 102. The landing-pad device 102 can process the wind data 101 and display a visual marker 112 on a display of the landing-pad device 102, the visual marker 112 indicating at least a wind direction at a location of the landing-pad device 102. The visual marker 112 can also indicate a wind speed (or wind magnitude) at the location of the landing-pad device 102. The wind speed can be encoded in the visual marker 112 as a single indicator. Alternatively, the visual marker 112 can include multiple indicators, such as a first indicator to indicate a wind direction and a second indicator to indicate a wind speed. The VTOL drone 104 includes an image capture device, such as a camera 114 to capture one or more images of the landing-pad device 102. In particular, the VTOL drone 104 captures the visual marker 112 in the one or more images. The VTOL drone 104 can use computer vision to detect the visual marker 112, as well as determine the wind direction at the location of the landing-pad device 102 from the visual marker 112. In other cases, the VTOL drone 104 can also determine the wind speed at the location of the landing-pad device 102 from the visual marker 112, as described herein. It should be noted that "wind direction" can be a direction of wind as captured in a wind direction measurement. In the various embodiments, the wind direction measurement is made from taking an image of the visual marker displayed on the landing-pad device. The "wind direction" is a digital representation of the actual wind direction in physical space. In some cases, the wind direction can be the output to another subsystem, such as a propulsion subsystem.

In another embodiment, the landing system 100 includes the landing-pad device 102 with a communication subsystem (e.g., including a radio 108), a first processing device, and a display 110. The first processing device receives wind data 101 from the weather station system 106 via the communication subsystem. The wind data indicates a wind direction at a location of the landing-pad device 102. The first processing device displays the visual marker 112 on the display, the visual marker 112 corresponding to the wind direction. The VTOL drone 104 includes the camera 114, a propulsion subsystem, and a second processing device. The second processing device captures an image of the display 110 of the landing-pad device 102 using the camera 114. The second processing device detects the visual marker 112 in the image and determines the wind direction from the visual marker 112. The second processing device outputs the wind direction to the propulsion subsystem. The propulsion subsystem orients the VTOL drone 104 toward the wind direction. Alternatively, the propulsion subsystem is controlled by a flight manager. The flight manager can be processing logic comprising hardware, firmware, software, or any combination thereof that controls the propulsion subsystem to fly the VTOL drone 104. The second processing device outputs the wind direction to the flight manager and the flight manager aligns the aerial vehicle into the wind direction via the propulsion subsystem.

In a further embodiment, the communication subsystem includes a receiver (e.g., the radio 108) that communicates with a transmitter (e.g., radio) of the weather station system 106. The communication subsystem includes a receiver coupled to a wired connection between the communication subsystem and the weather station system 106. Alternatively, the communication subsystem includes the radio 108 that establishes a wired connection between the radio 108 and a radio of the weather station system 106. The weather station system 106 can be the source of weather information, including wind direction and wind speed at the location of the landing-pad device 102. In another embodiment, the weather station system 106 can be integrated into the landing-pad device 102. In this embodiment, the landing-pad device 102 does not necessarily need a communication subsystem with a receiver as the weather station system 106 can input the wind information directly.

Although the landing system 100 includes a VTOL drone 104 with a set of a set of propellers in the propulsion subsystem and a delivery container to store a product, in other embodiments, other aerial vehicles that can be in a VTOL orientation can be used.

In one embodiment, the visual marker 112 includes a wind indicator. The second processing device determines the wind direction by determining an orientation of the wind indicator and determines the wind speed by determining a brightness level of the wind indicator. In another embodiment, the visual marker 112 includes a wind-direction indicator and a wind-speed indicator. The second processing device determines the wind direction by determining an orientation of the wind-speed indicator and determines a wind speed from the wind-speed indicator. In another embodiment, the visual marker 112 includes a pointer needle that points in the wind direction. The second processing device determines the wind direction by determining an angle of the pointer needle.

In the computer vision approach, the landing-pad device 102 can include a ring of light emitting diodes (LEDs), such as ultra-bright LEDS embedded in the landing-pad device 102 as the display 110. A weather station system 106 (or weather service) would feed data to the landing-pad device 102, which would light up the ring of LEDs indicating the wind direction, such as by "drawing" a triangle or a pointer needle. The pointer needle can operates similar as a compass needle, except instead of pointing to magnetic north the pointer needle points in the wind direction. In general, wind direction is reported by the direction from which it originates. For example, a northerly wind blows from the north to the south. Wind direction is usually reported in cardinal directions or in azimuth degrees. Wind direction can be measured in degrees clockwise from due north, for example.

In a further embodiment, the color or intensity of the ring of LEDs could represent the wind speed (also referred to as wind intensity or wind magnitude). As the VTOL drone 104 is approaching the landing-pad device 102 in VTOL orientation it would simply use its downward camera 114 to inspect the ring and illuminated LED and use that information to orient itself into the wind direction. For example, a propulsion subsystem of the VTOL drone 104 can align the VTOL drone 104 into the wind direction using the wind direction. That is, the VTOL drone 104 can point the VTOL drone 104 into the wind direction determined from the one or more images captured by the camera 114.

In another embodiment, the VTOL drone 104 includes a delivery container to store a product, a propulsion subsystem, the camera 114, and a processing device coupled to the propulsion subsystem and the camera 114. The processing device determines that the VTOL drone 104 is about to land on the landing-pad device 102. The landing page 102 has the display 110. The processing device instructs the camera 114 to capture image data of the display 110 of the landing-pad device 102 before the VTOL drone 104 lands on the landing-pad device 102. The processing device detects the visual marker 112 in the image data. An orientation of the visual marker 112 on the display 110 indicates a wind direction at a location of the landing-pad device 102. The processing device determines the wind direction from the orientation of the visual marker 112 and controls the propulsion subsystem to align the VTOL drone 194 into the wind direction. For example, the processing device can output the wind direction to the propulsion subsystem and the propulsion subsystem aligns the VTOL drone 104 into the wind direction.

In a further embodiment, the visual marker 112 also indicates a wind speed at the location of the landing-pad device 102. The processing device can determine the wind speed from the visual marker 112. In another embodiment, the visual marker 112 includes a wind indicator, such as a pointer needle 113. The processing device determines an orientation of the pointer needle 113 (e.g., the wind indicator) to determine the wind direction. The processing device can determine a brightness level of the pointer needle 113 (e.g., the wind indicator) to determine the wind speed. In another embodiment, the visual marker 112 includes the pointer needle 113, which is a wind-direction indicator, and a wind-speed indicator 115. The processing device determines an orientation of the wind-speed indicator to determine wind direction and determines the wind speed from the wind-speed indicator 115.

In another embodiment, the processing device determines that the VTOL drone 104 (or other aerial vehicle) is in a VTOL orientation. The processing device captures an image of the landing-pad device 102 using the camera 114. The processing device detects the visual marker 112 in the image. The processing device determines a wind direction at a location of the landing-pad device 102 from the visual marker 112. The processing device outputs the wind direction to the propulsion subsystem. The propulsion subsystem aligns the VTOL drone 104 into the wind direction. The processing device can detect the visual marker 112 in the image using a Machine Learning (ML) model, such as a deep learning model that is trained to detect the visual marker 112. For example, the deep learning model can include a pointer needle detector that detects the pointer needle in the image data. Once the pointer needle is detected, the processing device can determine an orientation of the pointer needle to determine the wind direction. The processing device can also determine a wind speed from the pointer needle, such as the size of the pointer needle, a brightness level of the pointer needle, or the like. The processing device can also determine a wind speed from a separate wind-speed indicator. Computer vision allows machines to identify people, places, and things in images with accuracy at or above human levels with much greater speed and efficiency. Often built with deep learning models, it automates extraction, analysis, classification, and understanding of useful information from a single image or a sequence of images. The image data can take many forms, such as single images, video sequences, views from multiple cameras, or three-dimensional data. The application here of computer vision is to identify a visual marker, as well as attributes of the visual marker that are indicative of encoded weather information, such as wind direction, wind speed, and/or the like. In other embodiments, image classification models can be used for similar purposes. The ML models can provide a fast, reliable image recognition platform to help drones in VTOL orientation land safely. In another embodiment, visual fiducials can be used on the landing-pad device and detected in the images for alignment purposes. For example, the display of the landing-pad device can display a QR code on a corner of the display. The QR code can include position information, device information, or the like, and can also serve as a fiducial for alignment purposes, such as a reference orientation of the landing pad for purposes of determining a wind direction. For example, the processing device can detect the visual marker in the image with respect to a visual fiducial for a reference point.

The processing device can determine the wind direction by determining an orientation of the visual marker 112 relative to a reference orientation or a reference point. The orientation of the visual marker 112 on the display can be determined with respect to the reference orientation or reference point. The orientation of the visual marker 112 indicates the wind direction at the location of the landing-pad device 102.

In another embodiment, the visual marker 112 includes a barcode with the wind direction, the wind speed, or both encoded in the barcode. The barcode can be a one-dimensional (1D) barcode or a two-dimensional (2D) barcode. The processing device determines the wind direction, the wind speed, or both by decoding the barcode. For example, QR code, which is short for quick response code, is a type of 2D barcode that can be read using a QR barcode reader or camera-enabled drone with QR reader software. A QR code is able to carry information in both the vertical and the horizontal direction, which is why it is called a 2D barcode.

In another embodiment, the visual marker 112 includes a pointer needle that points in the wind direction. The processing device determines the wind direction by determining an angle of a pointer needle. In another embodiment, the visual marker 112 includes a digital number of the wind direction. The processing device determines the wind direction by recognizing the digital number in the image. In one embodiment, the visual marker 112 includes a first digital number of the wind direction and a second digital number of wind speed. The processing device determines the wind direction by recognizing the first digital number in the image. The processing device determines the wind speed by recognizing the second digital number in the image. Alternatively, the visual marker can be a digital character or sequence of characters, such as N, S, E, W, NW, NE, SW, and SE, as well as additional information, such a relative degree from N, S, E, or W, or the like.

Figure 2:
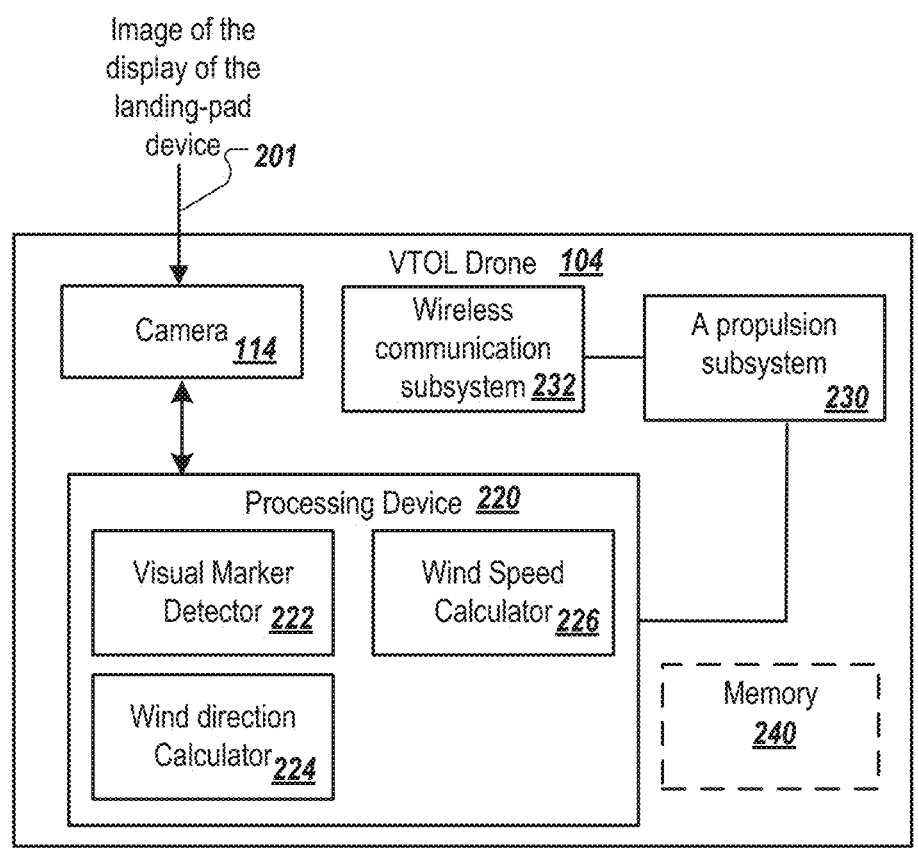
FIG. 2 is a block diagram of a VTOL drone according to one embodiment.

FIG. 2 is a block diagram of a VTOL drone 104 according to one embodiment. The VTOL drone 104 includes multiple components, including the camera 114, a processing device 220, a propulsion subsystem 230, and a wireless communication subsystem 232. The camera 114 can capture one or more images 201 of the display of the landing-pad device. The image data can be input into the processing device 220 for processing. The image data can include one or more images of the display of the landing-pad device. The image data can include the visual marker as described above with respect to FIG. 1. In another embodiment, the VTOL drone 104 includes memory 240, such as one or more memory devices to store the image data.

In the depicted embodiment, the processing device 220 can execute one or more software components, including a visual marker detector 222, a wind direction calculator 224, and a wind speed calculator 226. The visual marker detector 222 can detect the visual marker in the image data captured by the camera 114. The wind direction calculator 224 can determine a wind direction from the visual marker detected by the visual marker detector 222. The wind speed calculator 226 can determine a wind speed from the visual marker detected by the visual marker detector 222. The processing device 220 can output the wind direction, the wind speed, or both to the propulsion subsystem 230. The propulsion subsystem 230 also receives additional information from the wireless communication subsystem 232. The additional information can include navigation information, telemetry information, or the like. The propulsion subsystem 230, knowing a current orientation of the VTOL drone 104, can adjust the current orientation to an orientation in which the VTOL drone 104 is pointing in the wind direction as determined by the wind direction calculator 224. In another embodiment, the processing device 220 can store the wind direction, the wind speed, or both in the memory 240. The propulsion subsystem 230 can retrieve the wind direction, the wind speed, or both from the memory 240.

Figure 3:
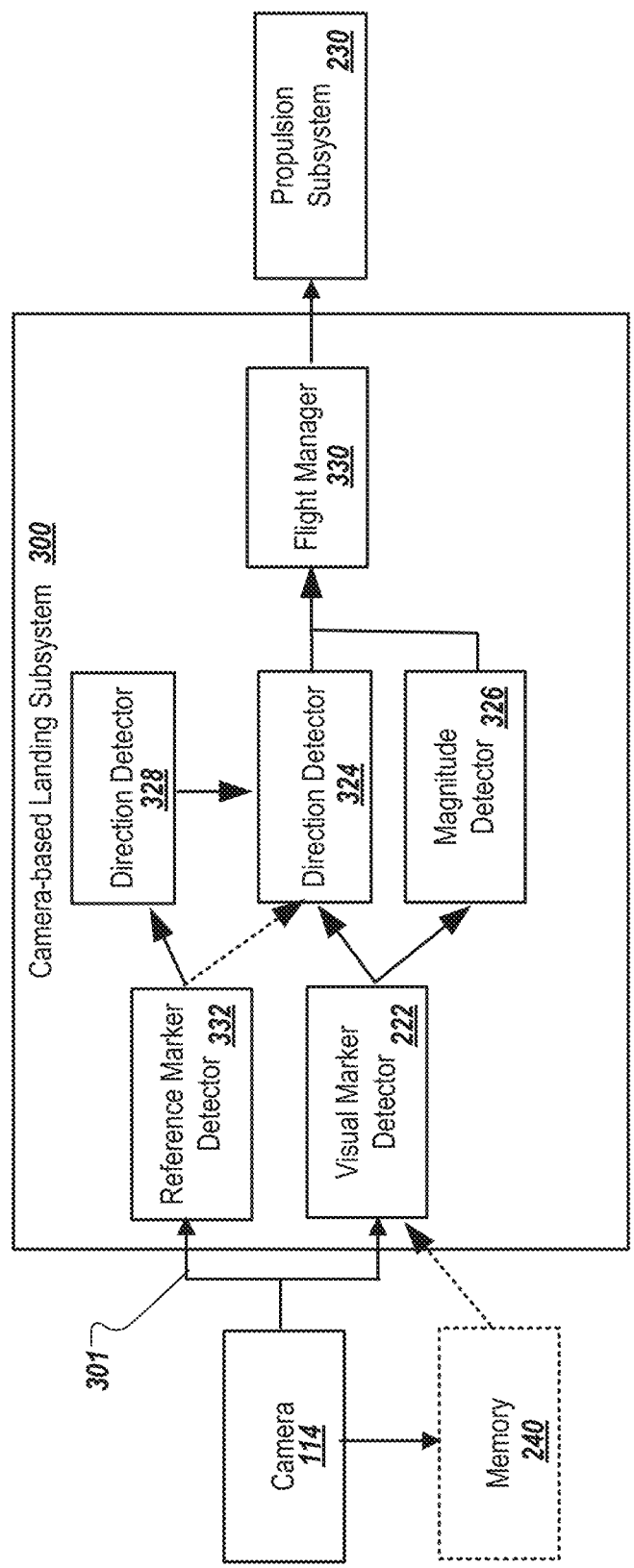
FIG. 3 is a block diagram of a camera-based landing subsystem to receive image data, process wind direction from the image data, and output wind direction to a propulsion subsystem according to one embodiment.

FIG. 3 is a block diagram of a camera-based landing subsystem 300 to receive image data, process wind direction from the image data, and output wind direction to a propulsion subsystem according to one embodiment. In one embodiment, the camera-based landing subsystem 300 includes processing logic comprising hardware (e.g., circuitry, dedicated logic, programmable logic, microcode, etc.), software, firmware, or a combination thereof. In another embodiment, the camera-based landing subsystem 300 is a set of instructions stored in memory 240 and executed by a processing device to perform various operations as described below. The camera-based landing subsystem 300 can include multiple components, including a reference marker detector 332, the visual marker detector 222, a direction detector 324, a magnitude detector 326, a direction detector 328, and a flight manager 330 that controls the propulsion subsystem 230. The camera-based landing subsystem 300 can receive image data 301 from the camera 114. Alternatively, the camera-based landing subsystem 300 can retrieve the image data 301 from the memory 240. The image data 301 can be processed by the reference marker detector 322 to detect a reference point or a reference marker in the image data 301. The visual marker detector 222 can detect a visual marker in the image data 301. As described herein, the visual marker detector 222 (and/or the reference marker detector 332) can implement a ML model to detect the visual marker detector 222 in the image data 301. Once the reference marker detector 332 detects the reference marker, the direction detector 328 can determine a reference point in the image data 301. Once the visual marker detector 222 detects the visual marker, the direction detector 234 can detect a wind direction from the visual marker. The direction detector 234 can determine the wind direction using the visual marker and the reference marker. In another embodiment, the direction detector 324 can be used to detect the direction of both the reference marker from the reference marker detector 332 and the visual marker from the visual marker detector 222. In a further embodiment, the magnitude detector 326 can determine a wind speed from the visual marker that is detected by the visual marker detector 222. The flight manager 330 can receive the wind direction from the direction detector 324 and the wind speed from the magnitude detector 326 in order to navigate the VTOL drone accordingly, especially when the VTOL drone is landing.

In one embodiment, the camera 114, reference marker detector 332, visual marker detector 222, direction detector 328, direction detector 324, and magnitude detector 326 are enabled when the flight manager 330 is in a landing mode. When in the landing mode, the camera 114 can be instructed to capture one or more images to be processed accordingly to determine at least wind direction so that the flight manager 330 can orient the VTOL drone towards the wind direction while landing. The flight manager 330 can orient the VTOL drone using the propulsion subsystem 230.

Figure 4:
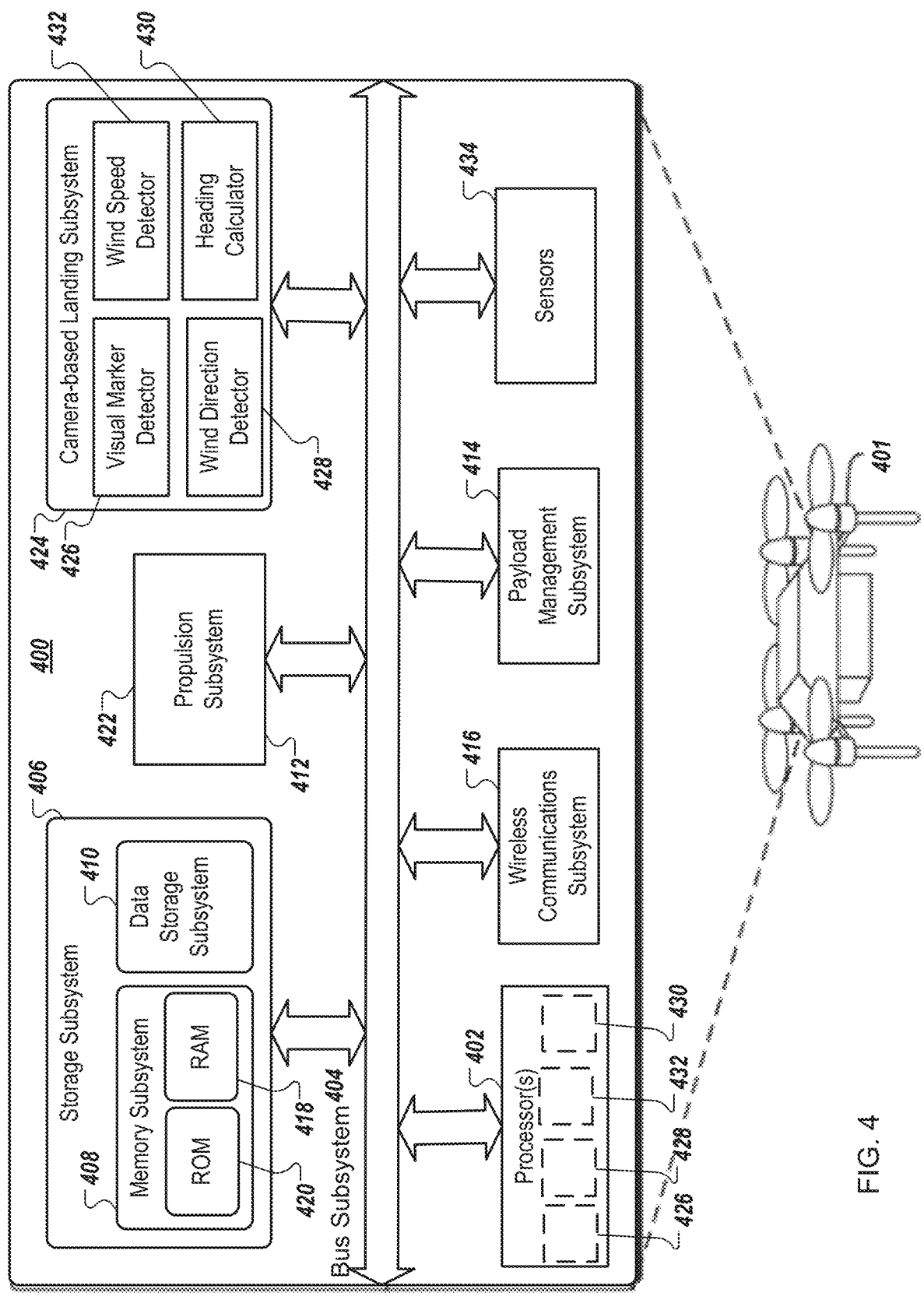
FIG. 4 is a block diagram of an on-board computer system of an unmanned aerial vehicle having a camera-based landing subsystem that may be used to practice at least one embodiment of the present disclosure.

FIG. 4 is a block diagram of an on-board computer system 400 of an unmanned aerial vehicle 401 (e.g., delivery drone) having a camera-based landing subsystem 424 that may be used to practice at least one embodiment of the present disclosure.

FIG. 4 is a block diagram of an on-board computer system 400 of an unmanned aerial vehicle 401 (e.g., delivery drone) having a camera-based landing subsystem 424 that may be used to practice at least one embodiment of the present disclosure. In various embodiments, the computer system 400 may be used to implement any of the systems illustrated herein and described above. As shown in FIG. 4, the on-board computer system 400 may include one or more processors 402 that may be configured to communicate with and are operatively coupled to a number of peripheral subsystems via a bus subsystem 404. These peripheral subsystems may include a storage subsystem 406, comprising a memory subsystem 408 and a data storage subsystem 410, a propulsion subsystem 412, a payload management subsystem 414, a wireless communication subsystem 416, the camera-based landing subsystem 424, comprising a visual marker detector 426, a wind direction detector 428, a wind speed detector 432, and a heading calculator 430, and a set of sensors 434. The visual marker detector 426 can be the visual marker detector 222 of FIGS. 2-3. The wind direction detector 428 can be the wind direction calculator 224 of FIG. 2 or the direction detector 324 of FIG. 3. The wind speed detector 432 can be the wind speed calculator 226 of FIG. 2 or the magnitude detector 326 of FIG. 3. The heading calculator 430 can calculate a heading of the unmanned aerial vehicle 401. In another embodiment, the visual marker detector 426, the wind direction detector 428, the wind speed detector 432, and the heading calculator 430 can be can be integrated into the processor 402 as illustrated as the hashed boxes in processor 402.

The bus subsystem 404 may provide a mechanism for enabling the various components and subsystems of computer system 400 to communicate with each other as intended. Although the bus subsystem 404 is shown schematically as a single bus, alternative embodiments of the bus subsystem may utilize multiple busses.

The wireless communications subsystem 416 may provide an interface to other computer systems and networks. The wireless communications subsystem 416 may serve as an interface for receiving data from and transmitting data to other systems from the computer system 400. For example, the wireless interface subsystem 416 may enable exchange of messages and other related information. In an embodiment, the wireless communications subsystem 416 uses the long-term evolution (LTE) standard to communicate with other wireless communications subsystems of other unmanned aerial vehicles, although the scope of the present disclosure includes wireless communications using any suitable standard and/or protocol. In some examples, the wireless communications subsystem 416 communicates using the Carrier Sense Multiple Access with Collision Avoidance (CSMA/CA) protocol or another suitable protocol. The wireless communications subsystem 416 may also facilitate the receipt and/or transmission of data on multiple networks, such as by transmitting some data directly to other unmanned aerial vehicles and transmitting other data through a cellular network.

The propulsion subsystem 412 may include various components that propel the unmanned aerial vehicle 401 and that control the propulsion of the unmanned aerial vehicle. For example, the propulsion subsystem 412 may include a plurality of motors, each with a propeller, and a controller for the motors that controls the individual rotational velocity of each propeller so as to control the unmanned aerial vehicle's speed, altitude, direction, pitch, roll, yaw, and, the flight dynamics of the unmanned aerial vehicle. The propulsion subsystem 412 may control other components (e.g., rudders, flaps, and other components that may affect the aerodynamics of the unmanned aerial vehicle) if the unmanned aerial vehicle is so equipped. While FIG. 4 shows a helicopter-style unmanned aerial vehicle, other unmanned aerial vehicles, such as noted above and, generally, any unmanned vehicle configured to travel on land, on sea, in sea, through air, and/or in space is considered as within the scope of the present disclosure and the specific mechanisms used for propulsion may vary in accordance with different embodiments.

The payload management subsystem 414 may be a set of components of the computer system 400 configured for the management of a payload of the unmanned aerial vehicle 401. For example, the payload management subsystem 414 may control a cargo bay that opens and closes to drop a payload delivered by the unmanned aerial vehicle 401. In some examples, an unmanned aerial vehicle has multiple cargo bays that can be used to selectively deliver one of many payloads. Generally, the payload management subsystem 414 may control one or more electrical and/or mechanical systems that enable the unmanned aerial vehicle to release a payload from the control of the unmanned aerial vehicle. The payload management subsystem 414 may also include various mechanisms (e.g., hooks, magnets, claws, and the like) for retrieving payloads and loading into a cargo bay of the unmanned aerial vehicle or otherwise for bringing a payload into the control of the unmanned aerial vehicle. As such, the payload management subsystem 414 may include a controller for one or more mechanisms (e.g., actuators or latches) that are used to open and close any cargo bays of the unmanned aerial vehicle or otherwise control one or more payloads. Generally, the payload management system may perform other functions dependent on the specific configuration of the unmanned aerial vehicle 401. For example, the payload management subsystem may be configured to deliver payloads in other ways in addition to or instead of opening cargo bays (e.g., by lowering a payload by a cable). The payload management subsystem 414 may perform more advanced functions, such as shifting payloads to improve flight characteristics, picking up payloads, and, generally, performing other functions that the unmanned aerial vehicle may be configured to perform. In other embodiments, the payload management system 414 may simply include a product container to store a product for delivery by the vehicle.

The storage subsystem 406 may provide a computer-readable storage medium for storing the basic programming and data constructs that may provide the functionality of at least one embodiment of the present disclosure. The applications (programs, code modules (i.e., programming modules), instructions) that, when executed by one or more processors, may provide the functionality of one or more embodiments of the present disclosure, may be stored in the storage subsystem 406. These application modules or instructions may be executed by the one or more processors 402. The storage subsystem 406 may additionally provide a repository for storing data used in accordance with the present disclosure. The storage subsystem 406 may comprise a memory subsystem 408 and a data (e.g., file/disk) storage subsystem 410 (e.g., for storing messages received, logs, and/or other information). The visual marker detector 426, the wind direction detector 428, the wind speed detector 432, and the heading calculator 430 can be instructions stored in a data store of the camera-based landing subsystem 424 or in the storage subsystem 406.

As illustrated in FIG. 4, the unmanned aerial vehicle's on-board computer system 400 may include a set of sensors 434 that gather data utilized by the various components of the on-board computer system. For instance, the sensors 434 may include an altimeter that is used by the propulsion subsystem 412 for flying and related activities (e.g., taking off and landing). As another example, the sensors 434 may include a gyroscope that is used by the propulsion subsystem 412 to control pitch, roll, and/or yaw. An accelerometer may be used by the propulsion subsystem 412 as part of its avionics logic. A Global Positioning System (GPS) sensor may be used by the propulsion subsystem 412 to control flight according to routes and also by other subsystems, such as by the one or more processors 402 for calculation of routes (e.g., by obtaining a current location and calculating an optimal route to a specified destination). The camera-based landing subsystem 424 may be used by the propulsion subsystem 412 to control direction, such as to align the orientation of the unmanned aerial vehicle 401 into the wind direction while landing. A set of proximity sensors (e.g., using acoustic proximity detectors) may be used by the propulsion subsystem 412 for the purpose of obstacle avoidance and accurate navigation (e.g., during a delivery). Some sensors may be used to gather environmental data, such as audio, video, digital images, and the like. Other environmental data may be related to the weather and, accordingly, the sensors 434 may include sensors that gather weather data, such as wind speed, barometric pressure, humidity, visibility, and the like. The sensors listed are examples and, generally, the specific sensors that are used on an unmanned aerial vehicle may vary in accordance with the tasks that the unmanned aerial vehicle performs.

The camera-based landing subsystem 424 can be configured and can operate in a similar manner to the camera-based landing subsystem 300 described above with respect to FIG. 3. The camera-based landing subsystem 424 can be configured and can be operate in a similar manner as described in the embodiments of FIGS. 1-2.

Figure 5:
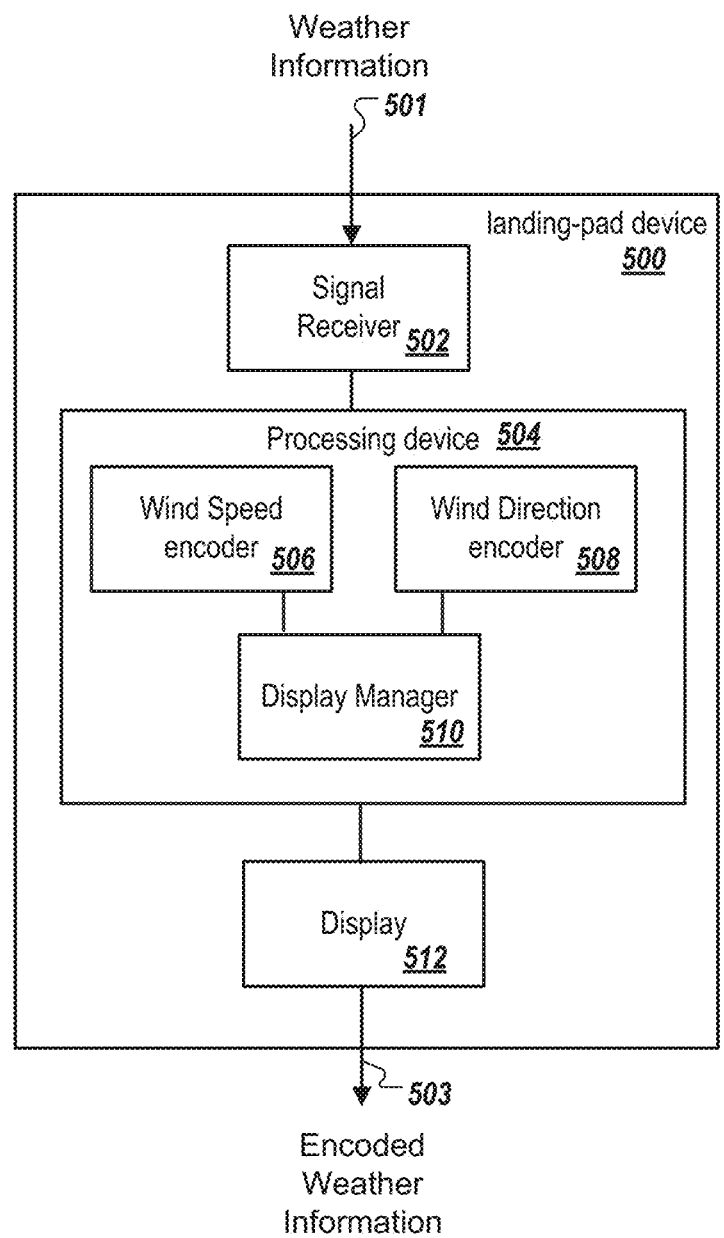
FIG. 5 is a block diagram of a landing-pad device to receive weather information from a weather station and display encoded weather information on a display according to one embodiment.

FIG. 5 is a block diagram of a landing-pad device 500 to receive weather information 501 from a weather station and display encoded weather information 503 on a display 512 according to one embodiment. The landing-pad device 500 includes a signal receiver 502 to receive the weather information 501. The signal receiver 502 can be a wireless receiver, a wired receiver, or the like. The landing-pad device 500 includes a processing device 504 coupled to the signal receiver 502. The processing device 504 can receive the weather information 501 via the signal receiver 502. The processing device 504 can execute one or more software components, such as a wind speed encoder 506, a wind direction encoder 508, and a display manager 510. The wind speed encoder 506 can encode the wind speed into the encoded weather information 503 displayed on the display 512. The wind direction encoder 508 can encode the wind direction into the encoded weather information 503 displayed on the display 512. For example, the encoded weather information 503 can be displayed as a visual marker, such as a pointer needle, a barcode, a digital number, or the like. The display manager 510 can render the encoded weather information graphically on the display 512, such as with the visual marker as described herein. Although the processing device 504 executes separate encoders for the wind speed and the wind direction, a single encoder can be used to encode both the wind speed and the wind direction.

Alternatively, the processing device 504 can encode additional information than wind speed and wind direction into the encoded weather information 503.

Figure 6A:
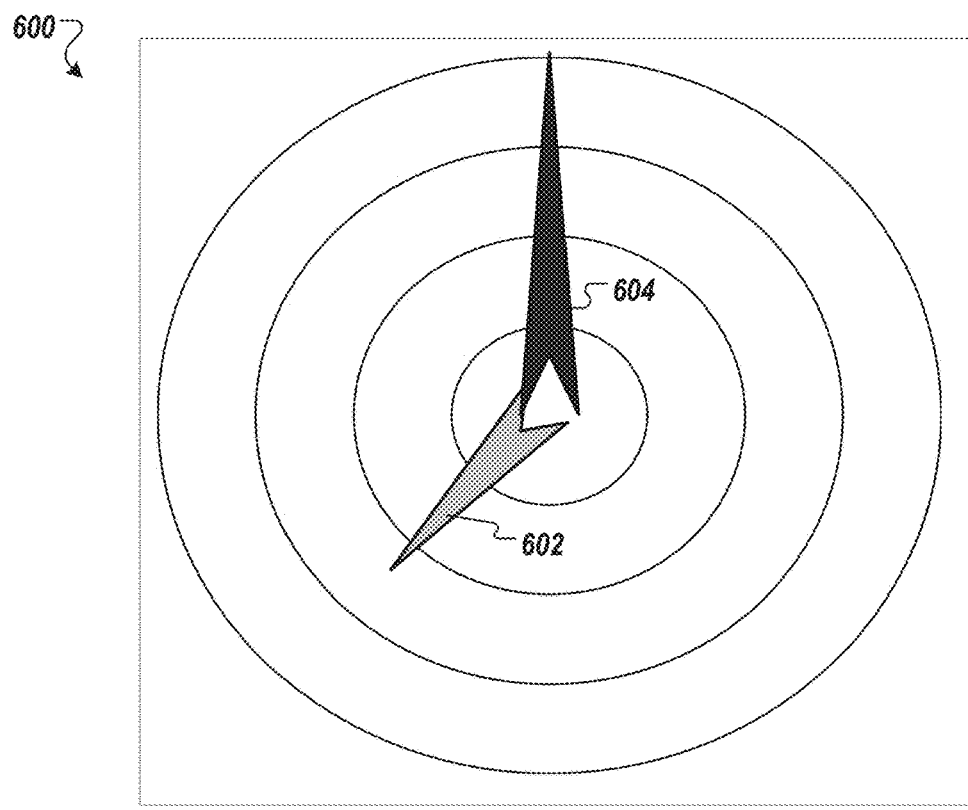
FIG. 6A illustrates one embodiment of a visual marker with a wind-direction indicator and a position reference indicator.

FIG. 6A illustrates one embodiment of a visual marker 600 with a wind-direction indicator 602 and a position reference indicator 604. The position reference indicator 604 can point in a known direction, such a North (or magnetic north) to provide a reference point to in the images captured by the camera of the VTOL drone. The wind-direction indicator 602 indicates a wind direction at a location of a landing-pad device on which the visual marker 600 is displayed. In a further embodiment, a brightness level of the wind-direction indicator 602 can indicate a wind speed at the location of the landing-pad device. In further embodiments, additional weather information can be ended in the visual marker 600.

Figure 6B:
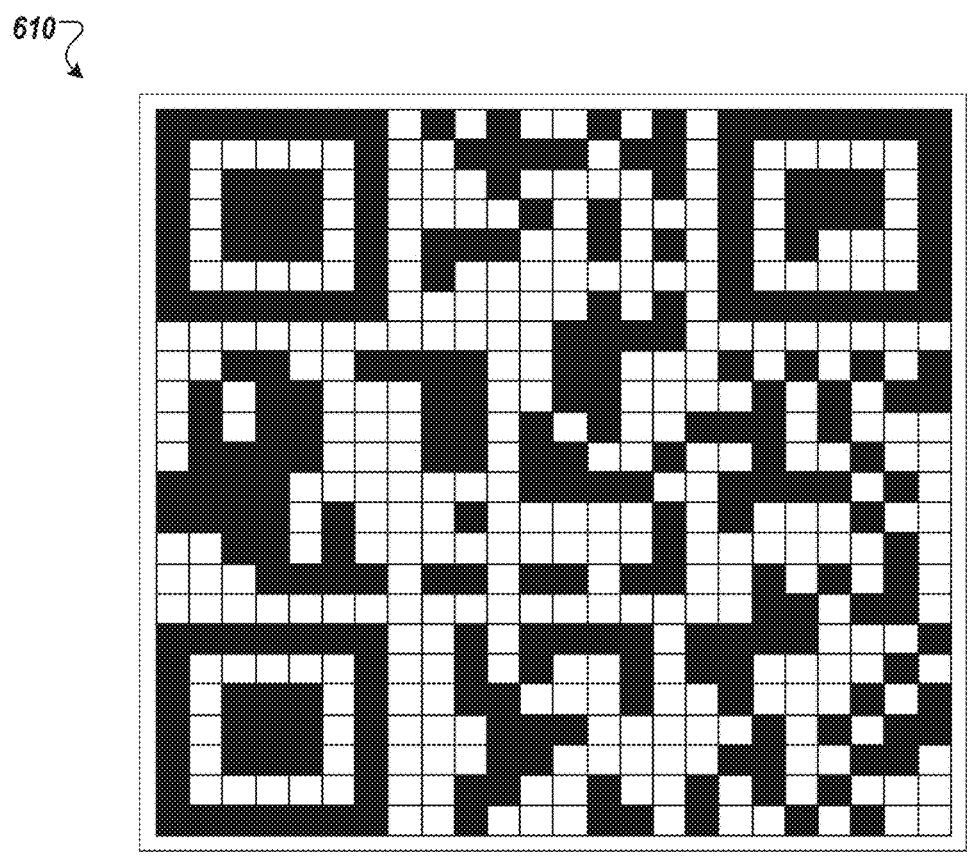
FIG. 6B illustrates another embodiment of a visual marker with wind direction encoded in a two-dimensional (2D) barcode.

FIG. 6B illustrates another embodiment of a visual marker 610 with at least wind direction encoded in a two-dimensional (2D) barcode. The visual marker 610 can encode additional weather information in the 2D barcode, such as wind speed or other weather information.

Figure 6C:
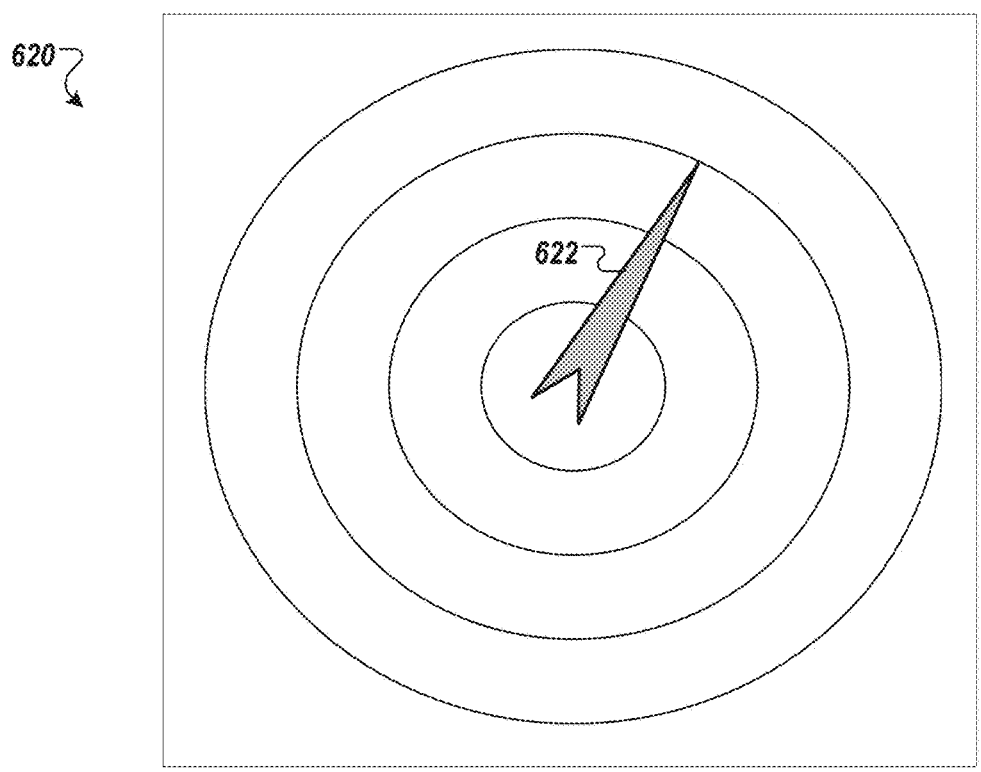
FIGS. 6C-6D illustrates another embodiment of a visual marker with a wind indicator indicating both wind direction and wind speed, where a size of the wind indicator represents the wind speed.
Figure 6D:
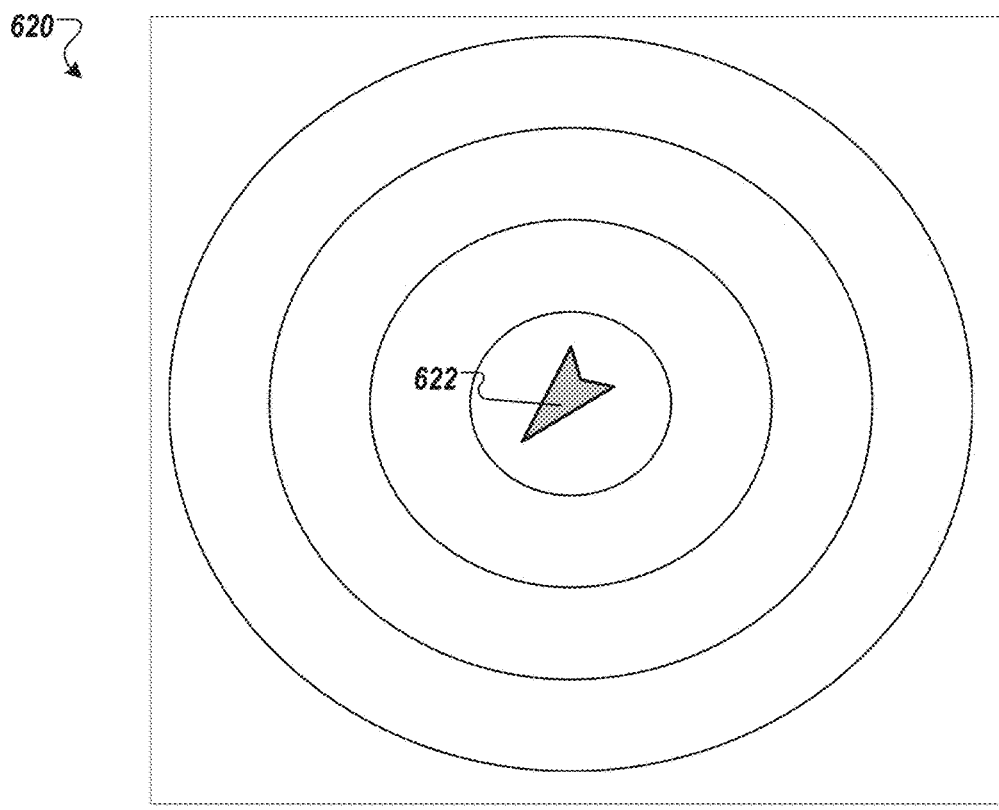

FIGS. 6C-6D illustrates another embodiment of a visual marker 620 with a wind indicator 622 indicating both wind direction and wind speed, where a size of the wind indicator 622 represents the wind speed. In FIG. 6A, the wind indicator 622 is pointed in a first direction and has a first size, representing a first magnitude. In FIG. 6B, the wind indicator 622 is pointed in a second direction and has a second size, representing a second magnitude that is less than the first magnitude. The VTOL drone can detect the wind indicator 622, determine the wind direction from an orientation of the wind indicator 622, and determine a wind speed from a size of the wind indicator 622.

Figure 6E:
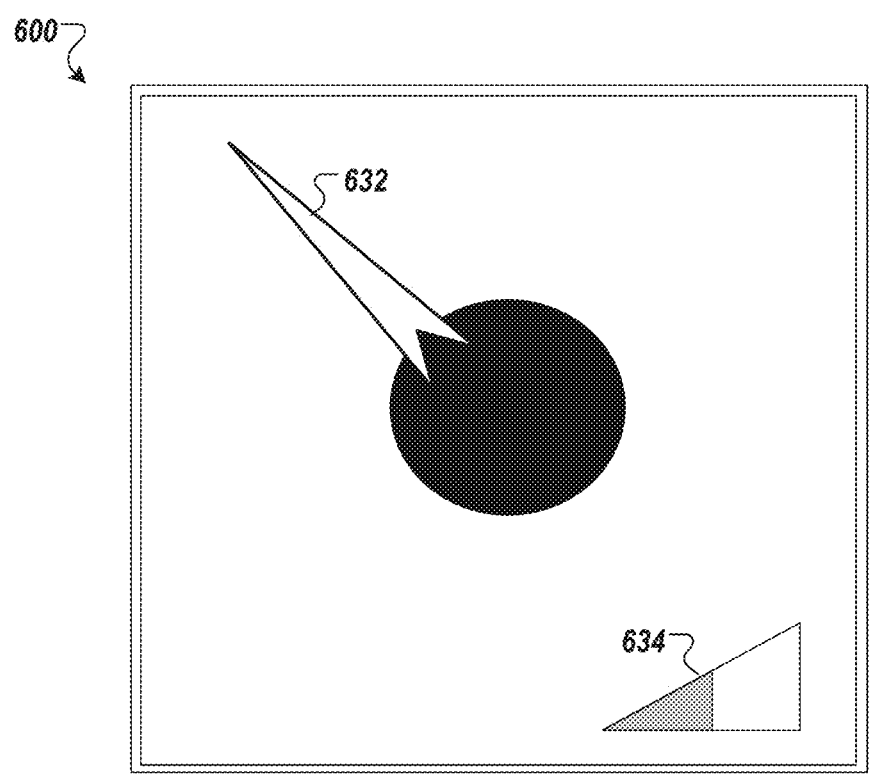
FIG. 6E illustrates another embodiment of a visual marker with a wind-direction indicator and a wind-speed indicator.

FIG. 6E illustrates another embodiment of a visual marker 630 with a wind-direction indicator 632 and a wind-speed indicator 634. The wind-direction indicator 632 indicates a wind direction at the landing-pad device and the wind-speed indicator 634 indicates a wind speed at the landing-pad device. The visual marker 630 is one example where the wind direction is encoded in a first indicator and the wind speed is encoded in a separate indicator. The wind-speed indicator 634 can present the wind speed as a proportion of a maximum amount, as separate bars, such as done with wireless signal indicators or power level indicators on displays of consumer devices. The wind-speed indicator 634 can also serve as a point of reference for determining an orientation of the wind-direction indicator 632.

Figure 7:
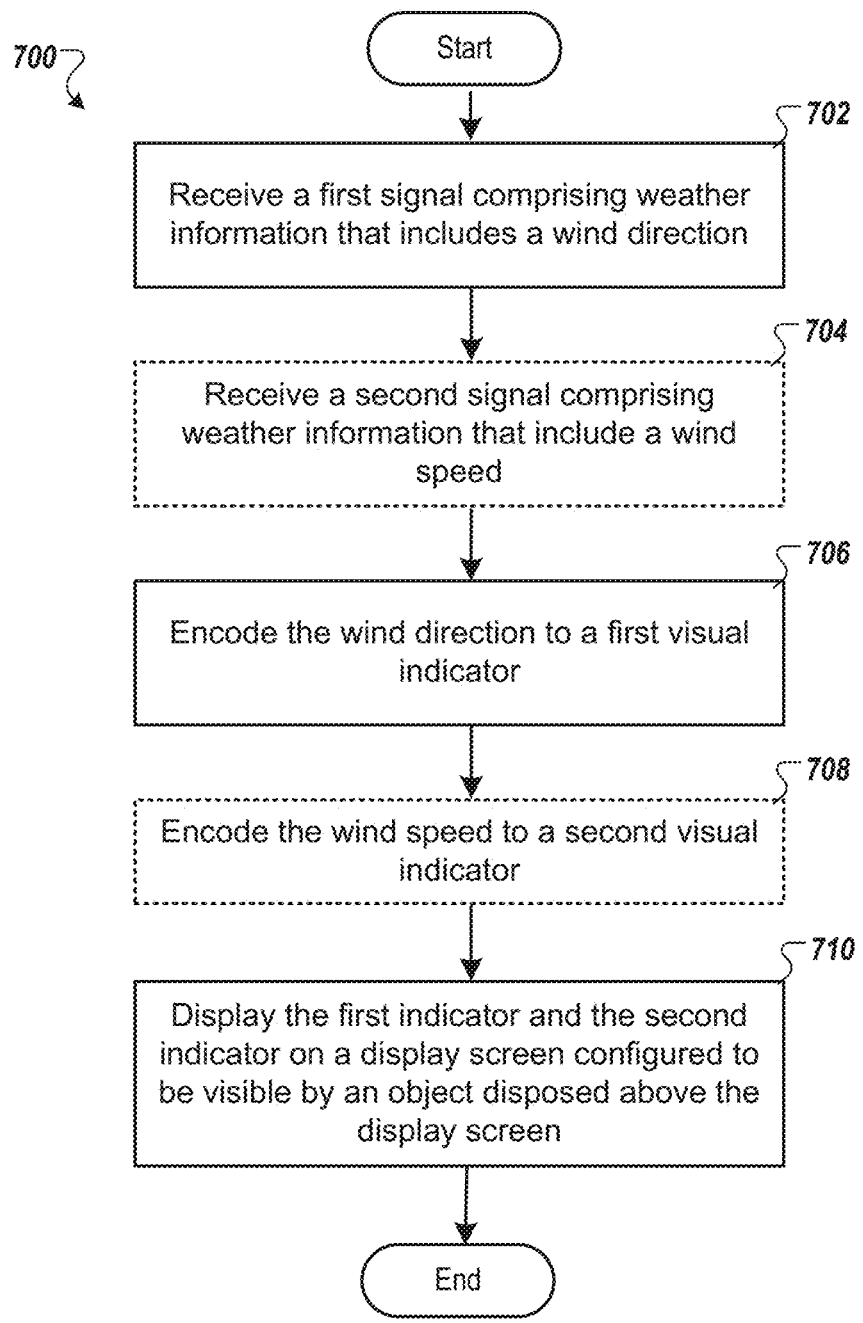
FIG. 7 is a flow diagram illustrating a method of operating a landing-pad device for displaying a visual indicator with a wind-direction indicator and a wind-speed indicator according to one embodiment.

FIG. 7 is a flow diagram illustrating a method 700 of operating a landing-pad device for displaying a visual indicator with a wind-direction indicator and a wind-speed indicator according to one embodiment. The method 700 may be performed by processing logic that comprises hardware (e.g., circuitry, dedicated logic, programmable logic, microcode, etc.), software, firmware, or a combination thereof. In one embodiment, method 700 may be performed by any of the landing-pad devices described herein and illustrated with respect to FIGS. 1-6.

Referring to FIG. 7, the method 700 begins by the processing logic receiving a first signal including weather information that includes at least wind direction (block 702). Optionally, the processing logic receives a second signal including additional weather information that includes at least wind speed (block 704). The processing logic encodes the wind direction into a first visual indicator (block 706). The processing logic encodes the wind speed into a second visual indicator (block 708). The processing logic displays the first indicator and optionally the second indicator on a display screen (block 710), and the method 700 ends. The display screen is configured to be visible by an object disposed above the display screen. The display screen can be integrated into a landing pad or disposed adjacent to the landing pad.

In another embodiment, the processing logic receives wind data from a weather station system via a communication subsystem. The wind data indicates a wind direction at a location of the landing-pad device. Similarly, the processing logic receives wind speed from the weather station system via the communication subsystem. The wind speed indicates the wind speed at the location of the landing-pad device. The processing logic displays a visual marker on the display, the visual marker corresponding to the wind direction. The processing logic can receive the weather information from the weather station system via a radio (e.g., wireless connection) or a wired connection. The processing logic can display the various visual markers described herein.

Figure 8:
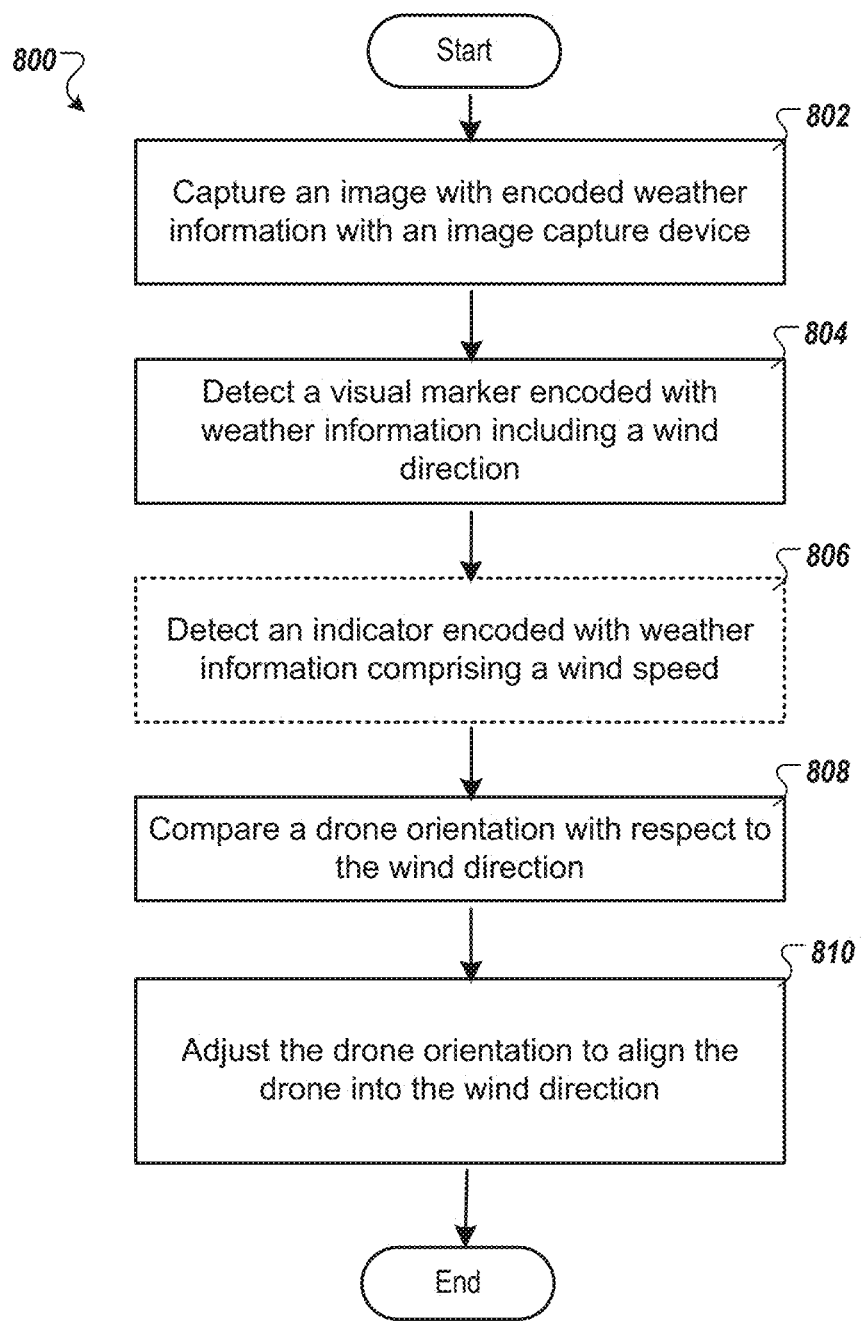
FIG. 8 is a flow diagram illustrating a method of operating an aerial vehicle for capturing an image of the visual indicator with the wind-direction indicator and the wind-speed indicator according to one embodiment.

FIG. 8 is a flow diagram illustrating a method 800 of operating an aerial vehicle for capturing an image of the visual indicator with the wind-direction indicator and the wind-speed indicator according to one embodiment. The method 800 may be performed by processing logic that comprises hardware (e.g., circuitry, dedicated logic, programmable logic, microcode, etc.), software, firmware, or a combination thereof. In one embodiment, method 800 may be performed by any of the aerial vehicles described herein and illustrated with respect to FIGS. 1-6.

Referring to FIG. 8, the method 800 begins by the processing logic capturing an image with encoded weather information with an image capture device (block 802). The processing logic detects a visual marker encoded with the weather information, including the wind speed (block 804). Optionally, the processing logic can detect an indicator encoded with weather information including the wind speed (block 806). The processing logic can determine a drone orientation with respect to the wind direction (block 808). The processing logic adjust the drone orientation to align the drone into the wind direction (block 810), and the method 800 ends.

In another embodiment, the processing logic determines that a VTOL drone is about to land on a landing-pad device. The landing-pad device has a display. The processing logic instructs a camera of the VTOL drone to capture image data of the display of the landing-pad device before the VTOL drone lands on the landing-pad device. The processing logic detects a visual marker in the image data. Orientation of the visual marker on the display indicates a wind direction at a location of the landing-pad device. The processing logic determines the wind direction from the orientation of the visual marker. The processing logic controls the propulsion subsystem to align the VTOL drone into the wind direction.

In a further embodiment, the visual marker also indicates a wind speed at the location of the landing-pad device. The processing logic determines the wind speed from the visual marker. In another embodiment, the visual marker includes a wind indicator. The processing logic determines the wind direction by determining an orientation of the wind indicator. The processing logic determines the wind speed by determining a brightness level of the wind indicator. In another embodiment, the visual marker includes a wind-direction indicator and a wind-speed indicator. The processing logic determines the wind direction by determining an orientation of the wind-speed indicator and determines the wind speed from the wind-speed indicator.

In another embodiment, processing logic of an aerial vehicle determines that the aerial vehicle is in a VTOL orientation and captures an image of a landing-pad device using a camera. The processing logic detects a visual marker in the image. The processing logic determines a wind direction at a location of the landing-pad device from the visual marker. The processing logic outputs the wind direction to a propulsion subsystem. The propulsion subsystem aligns the aerial vehicle into the wind direction.

In a further embodiment, the processing logic detects the visual marker in the image using a ML model.

In another embodiment, the processing logic determines the wind direction by determining an orientation of the visual marker relative to a reference orientation. The orientation of the visual marker on the display indicates the wind direction at the location of the landing-pad device. In another embodiment, the processing logic determines a wind speed at the location of the landing-pad device from the visual marker. In another embodiment, the visual marker includes a wind indicator and the processing logic determines the wind direction by determining an orientation of the wind indicator. The processing logic determines the wind speed by determining a brightness level of the wind indicator. In another embodiment, the visual marker includes a wind-direction indicator and a wind-speed indicator. The processing logic determines the wind direction by determining an orientation of the wind-speed indicator and determines the wind speed from the wind-speed indicator.

In another embodiment, the visual marker includes a barcode (e.g., 1D barcode, 2D barcode). The barcode is encoded with the wind direction, the wind speed, or both. The processing logic determines the wind direction, the wind speed, or both, by decoding the barcode.

In another embodiment, the visual marker includes a pointer needle that points in the wind direction. The processing logic determines the wind direction by determining an angle of the pointer needle.

In another embodiment, the visual marker includes a digital number of the wind direction. The processing logic determines the wind direction by recognizing the digital number in the image. In another embodiment, the visual marker includes a first digital number of the wind direction and a second digital number of wind speed. The processing logic determines the wind direction by recognizing the first digital number in the image and determines the wind speed by recognizing the second digital number in the image.

Figure 9:
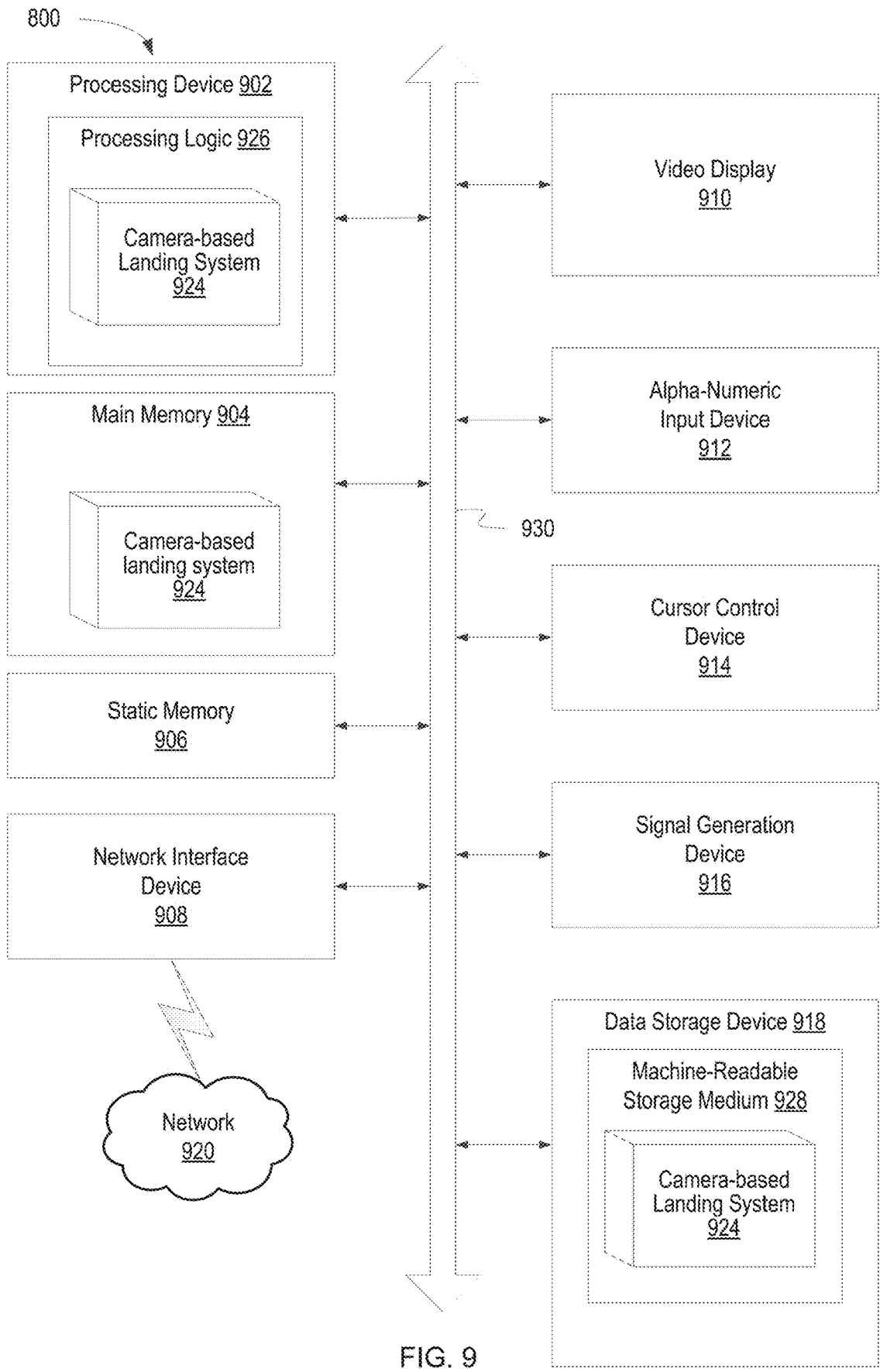
FIG. 9 illustrates a diagrammatic representation of a machine in the example form of a computer system including a set of instructions executable by a computer for a camera-based landing system according to any one or more of the methodologies discussed herein.

FIG. 9 illustrates a diagrammatic representation of a machine in the example form of a computer system 900 including a set of instructions executable by a computer for a camera-based landing system 924 according to any one or more of the methodologies discussed herein. In one embodiment, the computer system 900 may include instructions to enable execution of the processes and corresponding components shown and described in connection with FIGS. 1-8. In another embodiment, the computer system 900 is incorporated into any of the landing-pad device described herein. In another embodiment, the computer system 900 is incorporated into any of the aerial vehicles described herein.

In alternative embodiments, the machine may be connected (e.g., networked) to other machines in a LAN, an intranet, an extranet, or the Internet. The machine may operate in the capacity of a server machine in a client-server network environment. The machine may be a Personal Computer (PC), a server, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device (processor) 902, a main memory 904 (e.g., Read-Only Memory (ROM), flash memory, Dynamic Random Access Memory (DRAM) such as synchronous DRAM (SDRAM)), a static memory 906 (e.g., flash memory, Static Random Access Memory (SRAM)), and a data storage device 918, which communicate with each other via a bus 930.

Processing device 902 represents one or more general-purpose processing devices such as a microprocessor, central processing unit, or the like. More particularly, the processing device 902 may be a Complex Instruction Set Computing (CISC) microprocessor, reduced instruction set computing (RISC) microprocessor, very long instruction word (VLIW) microprocessor, or a processor implementing other instruction sets or processors implementing a combination of instruction sets. The processing device 902 may also be one or more special-purpose processing devices such as an Application Specific Integrated Circuit (ASIC), a Field Programmable Gate Array (FPGA), a Digital Signal Processor (DSP), network processor, or the like. In various implementations of the present disclosure, the processing device 902 is configured to execute instructions for the offset error detector 124 for performing the operations and processes described herein.

The computer system 900 may further include a network interface device 908. The computer system 900 also may include a video display unit 910 (e.g., a (LCD) or a Cathode Ray Tube (CRT)), an alphanumeric input device 912 (e.g., a keyboard), a cursor control device 914 (e.g., a mouse), and a signal generation device 916 (e.g., a speaker).

The data storage device 918 may include a computer-readable storage medium 928 (or machine-readable medium) on which is stored one or more sets of instructions of the offset error detector 124 embodying any one or more of the methodologies or functions described herein. The instructions may also reside, completely or at least partially, within the main memory 904 and/or within processing logic 926 of the processing device 902 during execution thereof by the computer system 900, the main memory 904 and the processing device 902 also constituting computer-readable media.

The instructions may further be transmitted or received over a network 920 via the network interface device 908. While the computer-readable storage medium 928 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely presented as examples. Particular implementations may vary from these example details and still be contemplated to be within the scope of the present disclosure. In the above description, numerous details are set forth.

It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to the desired result. The steps are those requiring physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing", "applying", "determining", "generating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A Vertical Take-Off and Landing (VTOL) drone comprising:
    a delivery container to store a product;
    a propulsion subsystem;
    a camera; and
    a processing device coupled to the propulsion subsystem, and the camera, wherein the processing device is to:
        determine that the VTOL drone is about to land on a landing-pad device, the landing-pad device having a display;
        instruct the camera to capture image data of the display of the landing-pad device before the VTOL drone lands on the landing-pad device;
        detect a visual marker in the image data, wherein orientation of the visual marker on the display indicates a wind direction at a location of the landing-pad device;
        determine the wind direction from the orientation of the visual marker; and
        control the propulsion subsystem to align the VTOL drone into the wind direction.

2. The VTOL drone of claim 1, wherein the visual marker also indicates a wind speed at the location of the landing-pad device, and wherein the processing device is further to determine the wind speed from the visual marker.

3. The VTOL drone of claim 2, wherein the visual marker comprises a wind indicator, wherein the processing device, to determine the wind direction, is to determine an orientation of the wind indicator, and wherein the processing device, to determine the wind speed, is to determine a brightness level of the wind indicator.

4. The VTOL drone of claim 2, wherein the visual marker comprises a wind-direction indicator and a wind-speed indicator, wherein the processing device, to determine the wind direction, is to determine an orientation of the wind-speed indicator, and wherein the processing device is to determine the wind speed from the wind-speed indicator.

5. An aerial vehicle comprising:
    a camera;
    a propulsion subsystem controlled by a flight manager; and
    a processing device coupled to the camera and the propulsion subsystem, wherein the processing device is to:
        determine that the aerial vehicle is in a vertical landing orientation;
        capture an image of a landing-pad device using the camera;
        detect a visual marker in the image;
        determine a wind direction at a location of the landing-pad device from the visual marker; and output the wind direction to the flight manager, wherein the flight manager is to align the aerial vehicle into the wind direction using the propulsion subsystem.

6. The aerial vehicle of claim 5, wherein the processing device is to detect the visual marker in the image with respect to a visual fiducial for a reference point.

7. The aerial vehicle of claim 5, wherein the processing device, to determine the wind direction, is to determine an orientation of the visual marker relative to a reference orientation, wherein the orientation of the visual marker on a display of the landing-pad device indicates the wind direction at the location of the landing-pad device.

8. The aerial vehicle of claim 5, wherein the processing device is further to determine a wind speed at the location of the landing-pad device from the visual marker.

9. The aerial vehicle of claim 8, wherein the visual marker comprises a wind indicator, wherein the processing device, to determine the wind direction, is to determine an orientation of the wind indicator, and wherein the processing device, to determine the wind speed, is to determine a brightness level of the wind indicator.

10. The aerial vehicle of claim 8, wherein the visual marker comprises a wind-direction indicator and a wind-speed indicator, wherein the processing device, to determine the wind direction, is to determine an orientation of the wind-speed indicator, and wherein the processing device is to determine the wind speed from the wind-speed indicator.

11. The aerial vehicle of claim 5, wherein the visual marker comprises a barcode encoded with the wind direction, a wind speed, or both, wherein the barcode is at least one of a one-dimensional (1D) barcode or a two-dimensional (2D) barcode, wherein the processing device, to determine the wind direction, the wind speed, or both, is to decode the barcode.

12. The aerial vehicle of claim 5, wherein the visual marker comprises a pointer needle that points in the wind direction, wherein the processing device, to determine the wind direction, is to determine an angle of the pointer needle.

13. The aerial vehicle of claim 5, wherein the visual marker comprises a digital number of the wind direction, wherein the processing device, to determine the wind direction, is to recognize the digital number in the image.

14. The aerial vehicle of claim 5, wherein the visual marker comprises a first digital number of the wind direction and a second digital number of a wind speed, wherein the processing device, to determine the wind direction, is to recognize the first digital number in the image, and wherein the processing device, to determine the wind speed, is to recognize the second digital number in the image.

15. A landing system comprising:
a landing-pad device comprising a communication subsystem, a first processing device, and a display, wherein the first processing device is to:
receive wind data from a weather station system via the communication subsystem, wherein the wind data indicates a wind direction at a location of the landing-pad device; and
display a visual marker on the display, the visual marker corresponding to the wind direction; and
an aerial vehicle comprising a camera, a propulsion subsystem controlled by a flight manager, and a second processing device, wherein the second processing device is to:
capture an image of the display of the landing-pad device using the camera detect the visual marker in the image;
determine the wind direction from the visual marker; and
output the wind direction to the flight manager, wherein the flight manager is to orient the aerial vehicle toward the wind direction using the propulsion subsystem.

16. The landing system of claim 15, wherein the communication subsystem comprises a radio that communicates with a radio of the weather station system.

17. The landing system of claim 15, wherein the aerial vehicle is a VTOL drone comprises a set of propellers in the propulsion subsystem and a delivery container to store a product.

18. The landing system of claim 15, wherein the visual marker comprises a wind indicator, wherein the second processing device, to determine the wind direction, is to determine an orientation of the wind indicator, and wherein the second processing device, to determine a wind speed, is to determine a brightness level of the wind indicator.

19. The landing system of claim 15, wherein the visual marker comprises a wind-direction indicator and a wind-speed indicator, wherein the second processing device, to determine the wind direction, is to determine an orientation of the wind-speed indicator, and wherein the second processing device is to determine a wind speed from the wind-speed indicator.

20. The landing system of claim 15, wherein the visual marker comprises a pointer needle that points in the wind direction, wherein the second processing device, to determine the wind direction, is to determine an angle of the pointer needle.

* * * * *